UNITED STATES PATENT OFFICE.

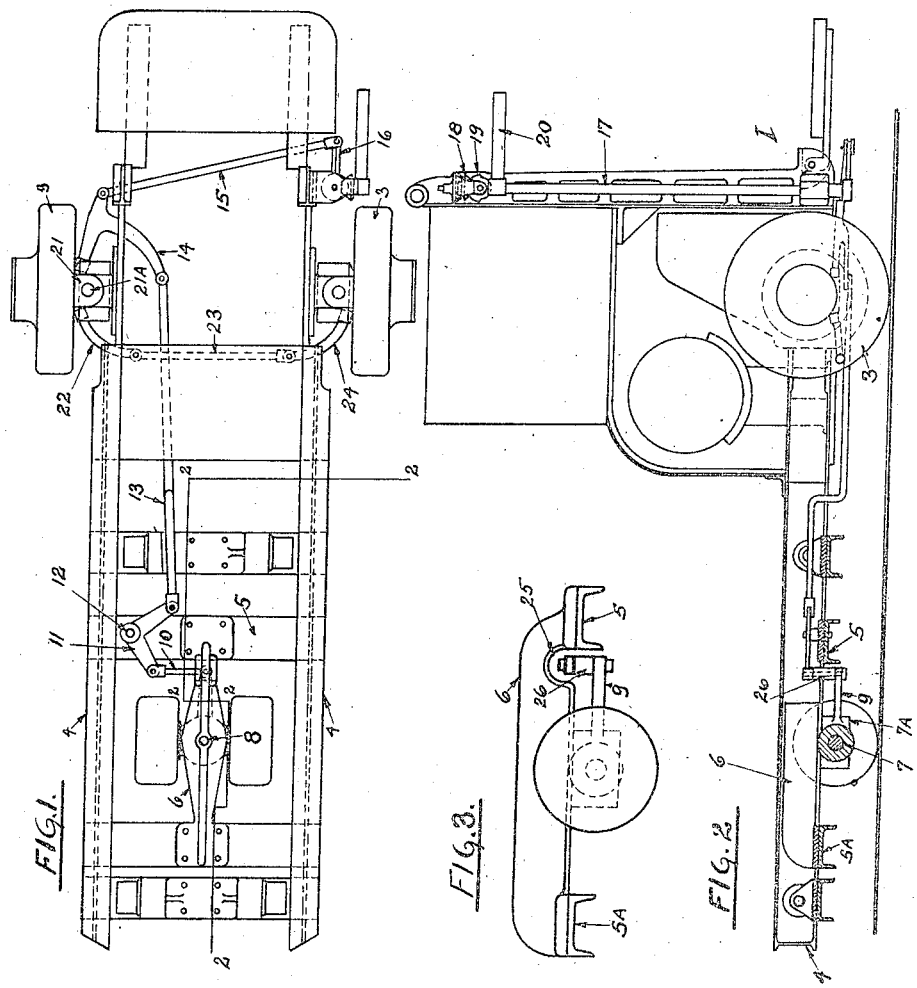

JOHN W. COX, OF ERIE, PENNSYLVANIA, ASSIGNOR OF ONE-FOURTH TO GEORGE R. METCALF AND ONE-FOURTH TO EDWARD E. WALKER, BOTH OF ERIE, PENNSYLVANIA.

TRUCK.

1,289,678.   Specification of Letters Patent.   Patented Dec. 31, 1918.

Application filed May 15, 1918. Serial No. 234,584.

*To all whom it may concern:*

Be it known that I, JOHN W. COX, a subject of the King of Great Britain, having declared my intention of becoming a citizen of the United States, residing at Erie, in the county of Erie and State of Pennsylvania, have invented new and useful Improvements in Trucks, of which the following is a specification.

This invention relates to trucks and consists in certain improvements in the construction thereof as will be hereinafter fully described and pointed out in the claims.

More particularly the invention is adapted for platform trucks ordinarily used in shop practice. These trucks have a very low platform and as ordinarily constructed are designed to have this platform moved to a position under the object to be moved and are ordinarily provided with means for lifting the container for the material to be moved. It is very essential, therefore, to get the platform as low as possible. At the same time it is desirable to have the working parts as nearly protected as possible because with such low clearance they are peculiarly subject to injury.

The invention is illustrated in the accompanying drawings as follows:—

Figure 1 shows a plan view of the truck, the truck platform being removed to better show the frame.

Fig. 2 a section on the line 2—2 in Fig. 1.

Fig. 3 an enlarged view of the fore and aft beam and immediate parts.

The frame 1 is provided with the drive wheels 3. The frame is formed with the sills 4 and these sills are connected near the front of the truck by cross beams 5 and 5ª. The fore and aft beam 6 is centrally located and extends from the cross beam 5 to the cross beam 5ª. A steering axle 7 is pivoted at 8 below the fore and aft beam 6 and is provided with sills 7ª, one each side of the fore and aft beam 6. Ordinarily these sills are quite close together and the fore and aft beam is formed to give sufficient turning movement. A steering arm 9 extends rearwardly from the axle 7 and is connected by a link 10 with a lever 11. The lever 11 is pivotally mounted above the cross beam 5 and on a pin 12. A link 13 connects the lever 11 with a lever 14 and the lever 14 is connected by a link 15 with a steering arm 16 on the steering post 17. A gear 18 on the steering post meshes a gear 19 secured to the steering handle 20. It will be readily observed that by operating the handle the movement is communicated through the intermediate mechanism to the axle so as to steer the truck. Ordinarily these trucks swing both sets of wheels so that the wheels track so that the truck can be more readily moved in the runways of shops. To accomplish this the wheels 3 are carried by the knuckles 21 pivotally mounted in the frame by pins 21ª. The lever 14 is secured to one of these knuckles. An arm 22 extends from the same knuckle and is connected by a link 23 with an arm 24 extending from the knuckle carrying the opposite wheel.

Heretofore the lever 11 has been placed below the cross beam 5 and has been subject to frequent injury by reason of the slight clearance of the truck. By placing this lever above the beam 5 this difficulty is entirely obviated. The axle 7 being below the fore and aft beam 6 and the fore and aft beam resting on the cross beam, the steering arm 9 is below the level of the lever 11. A post 26 is provided to make up this difference in level and the fore and aft beam has an arch 25 to allow the free movement of the link and post.

What I claim as new is:—

1. In a truck, the combination of a swinging axle; wheels on the axle; a fore and aft beam between the wheels on which the axle is pivoted; cross beams supported by the fore and aft beam; a steering arm extending from the axle; a lever mounted on the upper side of one of the cross beams; and a link connecting the steering arm and lever.

2. In a truck, the combination of a swinging axle; wheels on the axle; a fore and aft beam between the wheels on which the axle is pivoted; cross beams supported by the fore and aft beam; a steering arm extending from the axle below the fore and aft beam; a lever mounted on the upper side of one of the cross beams; and a link connecting the steering arm and lever.

3. In a truck, the combination of a swing-